United States Patent [19]

Schilling et al.

[11] 4,218,007

[45] Aug. 19, 1980

[54] METHOD OF DIFFUSION BONDING DUPLEX SHEET CLADDING TO SUPERALLOY SUBSTRATES

[75] Inventors: William F. Schilling, Rexford; Adrian M. Beltran, Ballston Spa, both of N.Y.

[73] Assignee: General Electric Company, Schenectady, N.Y.

[21] Appl. No.: 13,926

[22] Filed: Feb. 22, 1979

[51] Int. Cl.[2] ............... B23K 19/00; B23P 15/04
[52] U.S. Cl. ..................... 228/194; 228/234; 228/263 B; 29/156.8 B
[58] Field of Search ............ 228/193, 194–195, 228/263 B, 234; 29/156.8 B

[56] References Cited

U.S. PATENT DOCUMENTS

| | | | |
|---|---|---|---|
| 3,649,225 | 3/1974 | Simmons, Jr. | 428/651 |
| 3,849,865 | 11/1974 | Gedwill et al. | 228/263 F X |
| 3,873,347 | 3/1975 | Walker et al. | 427/250 |
| 3,874,901 | 4/1975 | Rairden | 427/250 |
| 3,904,101 | 9/1975 | Beltran et al. | 228/193 X |
| 3,928,901 | 12/1975 | Schilling et al. | 29/156.8 B |
| 3,952,939 | 4/1976 | Schilling et al. | 228/193 |

Primary Examiner—Carl E. Hall
Assistant Examiner—K. J. Ramsey
Attorney, Agent, or Firm—John F. Ahern; Lawrence D. Cutter

[57] ABSTRACT

A method of applying a duplex sheet cladding to a structural substrate is disclosed. The method utilizes hot isostatic pressure with molten glass as a pressure transmitting medium. An inner sheet cladding of aluminum is formed over the substrate and then an outer MCrAlY sheet cladding is assembled thereon which completely envelops and seals the inner cladding. Thereafter the duplex cladding is diffusion bonded to the substrate at elevated pressures and temperatures in accordance with a programmed time-temperature hot isostatic pressure cycle.

10 Claims, 2 Drawing Figures

METHOD OF DIFFUSION BONDING DUPLEX SHEET CLADDING TO SUPERALLOY SUBSTRATES

BACKGROUND OF THE INVENTION

A significant problem for advanced industrial, aircraft and marine gas turbines is the surface stability of superalloy components. Highly corrosive environments are generated by the combustion of heavy fuel oils, and when this is combined with higher firing temperatures and longer maintenance intervals, very strict limitations arise in material selection. It has become increasingly difficult to generate both creep-rupture strength and good corrosion resistance through alloy modification of the base metal alone. Thus, various coating and cladding schemes have been developed to provide surface protection to the superalloy substrate. The bonding of an oxidation and hot corrosion resistance sheet cladding to a turbine bucket or nozzle represents a solution to the surface stability problem.

Recently, considerable progress has been made in the development of methods for the diffusion bonding of cladding to a convex-concave substrate such as an airfoil or turbine blade. For example, Schilling et al, U.S. Pat. No. 3,928,901 teaches a method in which the sheet cladding is cold isostatically pressed to form a tight skin over the substrate. In Beltran, et al, U.S. Pat. No. 3,904,101, a process of cladding is disclosed in which the space between the cladding and the substrate is evacuated, all seams are vacuum brazed and thereafter the assembly is diffusion bonded in an autoclave using a gaseous medium and elevated temperature and pressure. Schilling et al, U.S. Pat. No. 3,952,939, teaches a process in which a preassembled sheet cladding and substrate are masked at all seams, surrounded with glass chips and then hot diffusion bonding while melting the glass and ensuring an isostatic stress state. These processes, heretofore employed, for providing claddings on convex-concave substrates involve only a single cladding layer.

An alternative method of protecting superalloy articles from high temperature oxidation and corrosion is by using coating techniques. Various coatings for superalloys have been described in the literature and of particular interest are coating compositions consisting essentially of chromium, aluminum, a member selected from the group consisting of yttrium and the rare earth elements, and a metal selected from the group consisting of iron, cobalt and nickel. These coating have been designated in the art as MCrAlY coatings.

Further coating improvements have been achieved by employing multiple coating layers. Thus Walker et al, U.S. Pat. No. 3,873,347 disclose coating a superalloy body with an MCrAlY coating by physical vapor deposition and then forming an aluminized overlayer by pack cementation. Rairden, U.S. Pat. No. 3,874,901, teaches a similar process with the exception that the aluminum overlayer is formed by physical vapor deposition. U.S. Pat. No. 3,649,225 teaches the use of a composite coating, in which a chromium or chromium rich interlayer is adjacent the superalloy substrate and over which is an outer MCrAlY layer. U.S. Pat. No. 4,005,989 discloses coating a superalloy substrate with an aluminide interlayer and then coating with an MCrAlY overcoat.

It is therefore an object of the present invention to provide a novel method of diffusion bonding double layers of sheet cladding to complex shaped superalloy components by a single bonding step and thereby eliminate a plurality of bonding steps such as those employed in the prior coating art.

SUMMARY OF THE INVENTION

In accordance with the present invention we have discovered a method for diffusion bonding two layers of sheet cladding to a substrate. The method is carried out by assembling an inner sheet cladding of aluminum to the substrate, assembling an outer corrosion resistant sheet cladding of MCrAlY over the inner sheet cladding whereby the outer sheet cladding completely envelops and seals the inner sheet cladding, and placing the cladding-substrate assembly into a deformable container. Thereafter the container is filled with a glass pressure transmitting medium so as to completely immerse the cladding-substrate assembly therein. The container is sealed and the claddings are diffusion bonded to the substrate at elevated pressures and temperatures in accordance with a programmed time-temperature hot isostatic pressure cycle. A key feature of our invention is the fact that during the diffusion bonding the inner aluminum cladding tends to liquify at the high temperatures and pressures used and is held in place by the pressurized, higher melting outer corrosion resistant MCrAlY cladding in which the aluminum cladding is encased. The pressurized state is maintained until the aluminum has fully reacted and solidified.

BRIEF DESCRIPTION OF THE DRAWING

The invention is more clearly understood from the following description taken in conjunction with the accompanying drawing in which.

DESCRIPTION OF THE INVENTION

Figure 1:
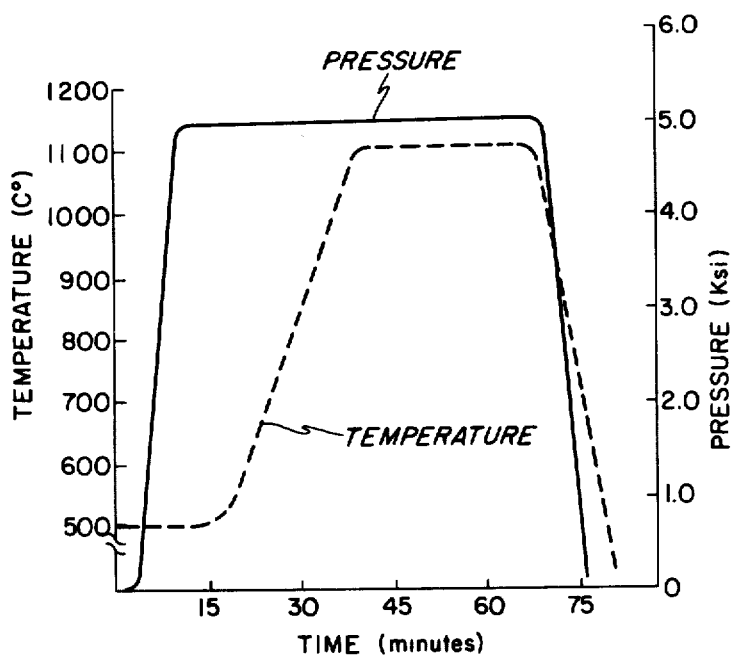
FIG. 1 is a graph showing typical pressure-temperature-time curves for the diffusion bonding step.

The method of our invention utilizes hot isostatic pressure in combination with molten glass as a pressure transmitting medium to fabricate the desired component. Initially the superalloy substrate surface is prepared, for example, by glass blasting, chemical etching and possibly nickel plating, followed by a suitable vacuum diffusion heat treatment. Then the inner sheet cladding or foil of aluminum is assembled over the substrate Typically this cladding has a thickness of about 0.5–3.0 mils.

Thereafter the outer sheet cladding of MCrAlY is formed to the shape of the substrate on a mandrel or master shape as for example by the method disclosed in Schilling, et al U.S. Pat. No. 3,928,901 and assigned to the assigneee of the present invention and incorporated hereby by reference. Briefly described, this method comprises the steps of: rough forming the sheet cladding to the master shape so that the sheet cladding closely abuts the convex surface of the master shape while the sheet cladding opposite the concave surface of the master shape is spaced from the concave surface; placing the sheet cladding and master shape in a sealed rubbery mold; and, applying isostatic pressure to the mold to deform the sheet cladding into contact with the master shape concave surface.

The chemical composition of the outer sheet cladding is designated herein as "MCrAlY" wherein M is a member selected from the group consisting of iron, cobalt and nickel. This cladding is broadly defined as consisting essentially in weight percent of the following nominal compositions:

| Ingredients | Weight % |
|---|---|
| Chromium | 15–50 |
| Aluminum | 0–6 |
| Yttrium | 0–3 |
| Tantalum | 0–5 |
| Iron<br>Cobalt<br>Nickel | Balance |

Included in this formulation are the compositions designated as FeCrAlY, CoCrAlY, NiCrAlY, FeCrY, NiCr, and CoCrAlYTa. The thickness of the outer sheet cladding may be in the range of about 5–30 mils, and with the preferred thickness being about 10 mils.

The formed outer sheet cladding and substrate already clad with an inner sheet cladding of aluminum are assembled to fully confine, envelop and seal the inner aluminum cladding. The assembly is prepared by masking all seams which are defined between the outer cladding sheet and substrate to prevent penetration by the pressure transmitting medium into the interface between the outer cladding and substrate. The masking step may be carried out by taping the seams or by tack welding the outer cladding sheet to the substrate along the seams. All that is required is that some step be taken to keep the pressure transmitting medium, whether it is in the solid or molten state, from entering the outer cladding-substrate assembly and to prevent the liquified inner aluminum cladding from escaping.

The masked assembly is then inserted into a deformable metal container (mild steel) which will collapse under pressures consistent with diffusion bonding. The volume of the deformable container is such that the cladding-substrate assembly may be completely immersed in a granular, densifying pressure transmitting medium and with sufficient clearances provided about the assembly edges such that during the diffusion bonding process, using hot isostatic pressing, none of the assembly edges will pierce the container under collapse. Glass beads or chips, made for example from ordinary soda lime glass, are preferred as a pressure transmitting medium because the glass will densify and become molten at diffusion bonding temperatures to provide an optimum hydrostatic pressure transmitting medium. Moreover glass is relatively inert, easily outgassed, and can be easily removed from the surface of the assembly after the diffusion bonding step.

After the deformable container is filled with both the masked cladding-substrate assembly and the pressure transmitting medium, the next step comprises sealing the container after it has been outgassed. This is accomplished by evacuation of the entire assembly followed by a forge-weld seal-off from the vacuum system.

The sealed container is put into a hot gas autoclave (hot isostatic press) for diffusion bonding at appropriate temperatures and pressures. See, for example, FIG. 1 which shows a time-temperature-pressure curve for a typical bonding cycle. During the diffusion bonding step the temperature as shown in the curve is initially maintained below about the melting temperature of aluminum (m.p. 660° C.), while the applied pressure is increased to about 5 Ksi. This increased pressure establishes intimate contact of the inner aluminum cladding with the substrate and the outer protective cladding. As the temperature is increased up to about 1100° C. (1200° C. maximum), the glass beads liquify (become viscous) and the subsequent volume change causes the deformable container to partially collapse about the cladding-substrate assembly ensuring an isostatic stress state to exist about the assembly. During this time, the aluminum inner cladding liquifies and then reacts in the liquid state with the substrate and cladding alloy to form the corresponding aluminide and solidify. It is especially important that the liquid aluminum is confined by the pressurized outer cladding until it has fully reacted. Generally, the temperatures and pressures used during the diffusion bonding step will vary to some extent and are dependent upon the materials which are bonded.

After the diffusion bonding step, the cladding-substrate assembly is removed from the deformable container and glass which was adhered to the surfaces of the bonded assembly is removed as by sand-blasting or by subsequent vacuum heating and water quenching of the assembly. Thereafter, the bonded assembly may be subjected to a final heat treatment, if required.

Our invention is further illustrated by the following examples:

Individual corrosion disc specimens of a Ni-base superalloy (IN 738) were first covered with aluminum foil of 0.7 or 3.0 mil thickness, and these were then sandwiched between 0.010" thick sheets of the following outer cladding alloys: Fe-25Cr-1Y (in weight percent); Fe-25Cr-0.1Y; Ni-50Cr; and Co-25Cr-5 Al-1Y-3Ta. The layered specimens, assembled by spot-welding the outer cladding alloys to the substrate to encapsulate the aluminum foil, were placed in a mild steel container filled with soda-lime glass beads, the container was outgassed through an evacuation tube at 600° F. (315° C.) for 16 hours under a vacuum of 5 to 10 microns, and sealed by forge-welding of the tube. This container was loaded into an autoclave preheated to 936° F. (500° C.), and the autoclave was argon-pressurized to 5000 psi. After a hold time of approximately 15 minutes, the autoclave temperature was raised to 2000° F., and temperature and pressure were held for 1 hour in accordance with the schematic diagram indicated in FIG. 1. Temperature and pressure were released, the assembly withdrawn, and specimens were removed from the mild steel container and examined metallographically. In all cases this processing sequence produced a nickel aluminide layer between the outer cladding and substrate, and these layers were metallurgically bonded to each other.

This experiment was repeated, wherein individual nickel-base superalloy substrate discs were glass-bead blasted and vapor degreased prior to assembly, and the bonding surface of the outer cladding alloy Fe-25Cr-4Al-1Y were polished with 400 grit emery paper and vapor degreased. An inner layer of 0.7 mil thick aluminum foil was spot-welded to the substrate, and the outer cladding layer was spot-welded to enclose this sandwich structure. The specimens were placed in a mild steel container, which was leak-checked on a helium mass spectrometer, outgassed at 600° F. for 16 hours under a 5 to 10 micron vaccum, and sealed by forge-welding. An identical HIP time-temperature-pressure cycle was employed in the autoclave, and once again, metallographic examinations revealed intimate bonding between layers, and the presence of a nickel aluminide inner layer.

Figure 2:
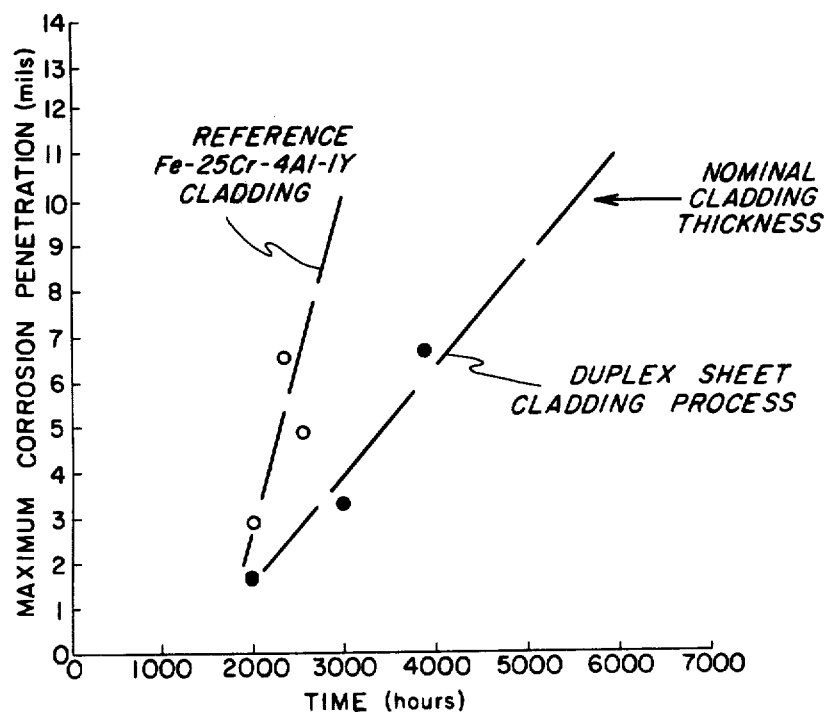
FIG. 2 is an illustration of the improved corrosion resistance properties provided by our novel duplex sheet cladding process as compared to a reference sample prepared with a single MCrAlY cladding.

The specimens were corrosion tested in a small combustion burner rig operating at 1800° F. on the products of combusted diesel oil containing 1% S and doped with artificial sea salt to produce 8 ppm Na in the atmosphere. Reference specimens containing a diffusion bonded cladding of Fe-25Cr-4Al-1Y, but without the inner nickel aluminide layer, were also exposed in this environment. Specimens were periodically removed as a function of exposure time, and cross-sections were examined metallographically. Measurements obtained at 100 times magnification of maximum corrosion penetration into the outer Fe-25CR-4Al-1Y cladding are plotted in FIG. 2 as a function of exposure time. The data shows that the presence of an inner nickel aluminide layer in the case of specimens processed with aluminum foil according to our novel duplex cladding process yields lower corrosion penetration after a given exposure time period. In addition, the increase in corrosion penetration with time occurs at a lower rate than the reference clad specimens without a nickel aluminide inner layer. Thus, the yields showed an increase in outer cladding life from approximately 3000 hours to 5500 hours for a 10 mil thickness of cladding.

It will be appreciated that the invention is not limited to the specific details shown in the examples and illustrations and that various modifications may be made within the ordinary skill in the art without departing from the spirit and scope of the invention.

We claim:

1. A method of applying a duplex sheet cladding to a structural substrate, said method comprising the steps of:
   (a) assembling an inner aluminum sheet cladding to the substrate so that the cladding closely conforms to the substrate;
   (b) assembling an outer MCrAlY sheet cladding to the substrate having the inner aluminum sheet cladding assembled thereon whereby the outer corrosion resistant sheet cladding completely envelops and seals the inner sheet cladding;
   (c) placing the cladding substrate assembly into a deformable container;
   (d) filling the container with a glass pressure transmitting medium so as to completely immerse the cladding-substrate assembly therein;
   (e) sealing the container so that it is air-tight;
   (f) diffusion bonding the cladding to the substrate by a hot isostatic pressing cycle wherein the temperature is initially maintained below the melting point of aluminum, the pressure is increased to establish intimate contact of the inner sheet cladding with the substrate and the outer sheet cladding, and thereafter the temperature is increased up to a maximum of 1200° C., while maintaining the pressurized state until the aluminum has fully reacted and solidified.

2. The method according to claim 1, wherein the substrate is a superalloy.

3. The method according to claim 2, wherein the superalloy is nickel-base.

4. The method according to claim 2, wherein the substrate has a concave-convex configuration.

5. The method according to claim 4, wherein the substrate is a turbine bucket.

6. The method according to claim 1, wherein the inner cladding has a thickness of 0.5-3 mils and the outer cladding has a thickness of 5-30 mils.

7. The method according to claim 6, wherein the outer sheet cladding has a composition consisting essentially in weight percent of 15-50% chromium, 0-6% aluminum, 0-3% yttrium, 0-5% tantalum and the balance a member selected from the group consisting of iron, cobalt and nickel.

8. The method according to claim 7, wherein said composition is Fe-25Cr-4Al-1Y.

9. The method according to claim 8, wherein said composition is Ni-50Cr.

10. The method according to claim 1, wherein said hot isostatic pressing cycle is in accordance with the conditions of temperature, pressure and time set forth in FIG. 1.